US012249764B2

(12) United States Patent
Wu et al.

(10) Patent No.: US 12,249,764 B2
(45) Date of Patent: Mar. 11, 2025

(54) TRANSPARENT ELECTROMAGNETIC WAVE FOCUSING DEVICE

(71) Applicant: WISTRON NEWEB CORPORATION, Hsinchu (TW)

(72) Inventors: Chin-Hsien Wu, Hsinchu (TW); Wei-Tung Yang, Hsinchu (TW); Tsun-Che Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 139 days.

(21) Appl. No.: 18/180,981

(22) Filed: Mar. 9, 2023

(65) Prior Publication Data

US 2024/0063549 A1 Feb. 22, 2024

(30) Foreign Application Priority Data

Aug. 16, 2022 (TW) ................................. 111130680

(51) Int. Cl.
*H01Q 15/10* (2006.01)
*H01Q 15/00* (2006.01)
*H01Q 19/06* (2006.01)

(52) U.S. Cl.
CPC ......... *H01Q 15/10* (2013.01); *H01Q 15/0086* (2013.01); *H01Q 19/062* (2013.01)

(58) Field of Classification Search
CPC ... H01Q 15/0086; H01Q 19/062; H01Q 1/246
See application file for complete search history.

(56) References Cited

U.S. PATENT DOCUMENTS

2019/0260135 A1* 8/2019 Kasahara ............... H01Q 19/06

OTHER PUBLICATIONS

Rahmati, et al.: "High Efficient Wideband Slot Transmitarray Antenna"; 0018-926X (c) 2015 IEEE. Personal use is permitted, but republication/redistribution requires IEEE permission. See http://www.ieee.org/publications_standards/publications/rights/index.html for more information; pp. 1-6.

* cited by examiner

*Primary Examiner* — Dimary S Lopez Cruz
*Assistant Examiner* — Anna N Hamadyk
(74) *Attorney, Agent, or Firm* — McClure, Qualey & Rodack, LLP

(57) ABSTRACT

A transparent electromagnetic wave focusing device is provided, which includes a plurality of metamaterial unit cells arranged to form a metamaterial array plate, and each metamaterial unit cell includes a plurality of metal layers and a plurality of transparent substrates stacked alternately. Each of the metal layers has a comb-tooth pattern, and the plurality of metamaterial unit cells correspond to a plurality of comb-tooth pattern combinations, respectively. The metamaterial array plate has an incident surface and an exit surface opposite to each other, and for an incident electromagnetic wave with a predetermined operating frequency band incident from the incident surface, the metamaterial unit cells correspond to a plurality of compensation phase differences, such that the incident electromagnetic wave that passes through the exit surface are focused on a reference point. The comb-tooth pattern combinations vary with the corresponding compensation phase differences.

13 Claims, 9 Drawing Sheets

TRANSPARENT ELECTROMAGNETIC WAVE FOCUSING DEVICE

CROSS-REFERENCE TO RELATED PATENT APPLICATION

This application claims the benefit of priority to Taiwan Patent Application No. 111130680, filed on Aug. 16, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a focusing device, and more particularly to a transparent electromagnetic wave focusing device.

BACKGROUND OF THE DISCLOSURE

With the rapid development of 5G communication protocol, wireless communication devices are capable of carrying a larger amount of information at a time. However, since electromagnetic waves attenuate during propagation, maintaining high-speed transmission efficiency has become an issue to be addressed.

A wireless access point (AP) is an important network device for accessing the Internet. Mobile phones can provide access points wirelessly, so as to provide users with a more convenient way of surfing the Internet compared to wired networks. However, for 5G millimeter wave frequency bands, the signal transmitted from the signal source to the indoor communication equipment attenuates at least −30 dB to −50 dB (under 28 GHz), so that excellent indoor wireless communication quality is difficult to be achieved.

Therefore, there is an urgent need in the related art for providing a faster wireless communication environment for users by maintaining signals that propagate from a signal source (e.g., a base station) to indoors at a high transmission efficiency.

SUMMARY OF THE DISCLOSURE

In response to the above-referenced technical inadequacies, the present disclosure provides a transparent electromagnetic wave focusing device capable of enhancing signal strength of electromagnetic waves.

In one aspect, the present disclosure provides a transparent electromagnetic wave focusing device that includes a plurality of metamaterial unit cells. The plurality of metamaterial unit cells are arranged to form a metamaterial array plate, and each metamaterial unit cell includes a plurality of metal layers and a plurality of transparent substrates stacked alternately. Each of the metal layers has a comb-tooth pattern, and the plurality of metamaterial unit cells correspond to a plurality of comb-tooth pattern combinations, respectively. The metamaterial array plate has an incident surface and an exit surface opposite to each other, and for an incident electromagnetic wave with a predetermined operating frequency band incident from the incident surface, the metamaterial unit cells correspond to a plurality of compensation phase differences, such that the incident electromagnetic wave that passes through the exit surface are focused on a reference point. The comb-tooth pattern combinations vary with the corresponding compensation phase differences.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
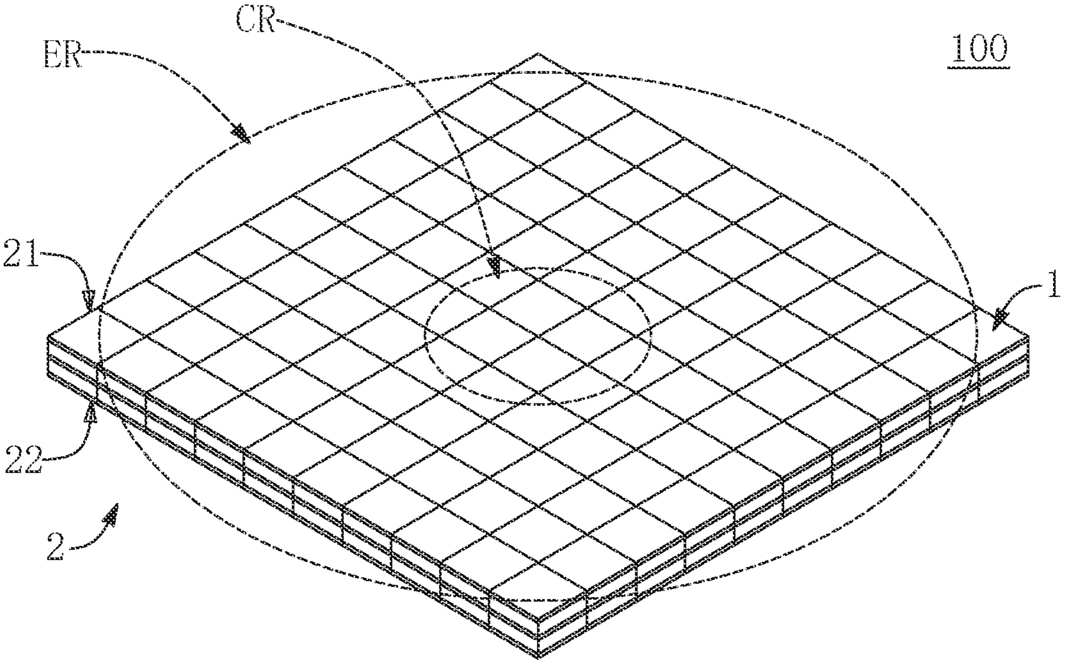
FIG. 1 is a schematic perspective view of a transparent electromagnetic wave focusing device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
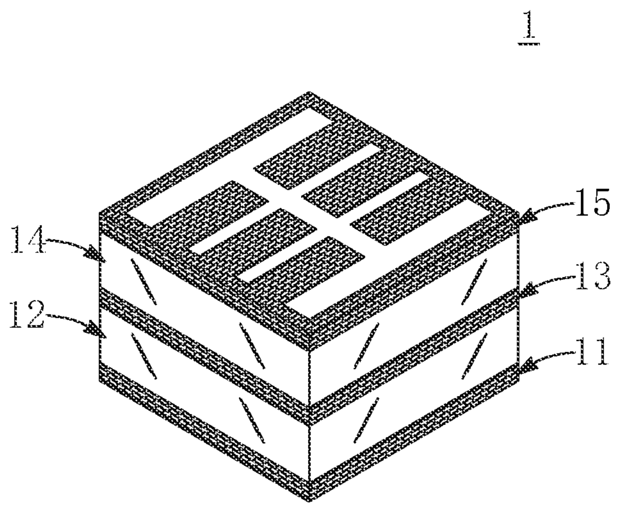
FIG. 2 is a schematic perspective view of a metamaterial unit cell according to one embodiment of the present disclosure.
Figure 3:
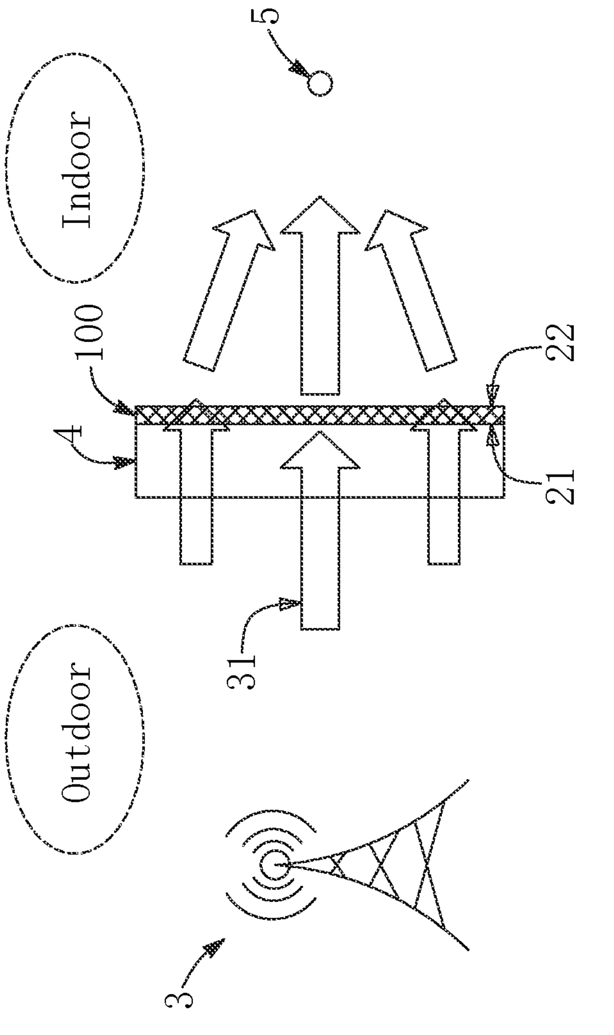
FIG. 3 is a schematic diagram of a practical application of a transparent electromagnetic wave focusing device according to one embodiment of the present disclosure.

FIG. 1 is a schematic perspective view of a transparent electromagnetic wave focusing device according to one embodiment of the present disclosure, FIG. 2 is a schematic perspective view of a metamaterial unit cell according to one embodiment of the present disclosure, and FIG. 3 is a schematic diagram of a practical application of a transparent electromagnetic wave focusing device according to one embodiment of the present disclosure. Referring to FIGS. 1 to 3, a first embodiment of the present disclosure provides a transparent electromagnetic wave focusing device 100, which includes a plurality of metamaterial unit cells 1 that are arranged to form a metamaterial array plate 2. Each of the metamaterial unit cells 1 includes a plurality of metal layers and a plurality of transparent substrates that are stacked alternately. Each of the metal layers has a comb-tooth pattern, and each of the metamaterial unit cells 1 has multiple ones of the comb-tooth pattern to form a comb-tooth pattern combination. For example, the metamaterial unit cell 1 includes a first metal layer 11, a first transparent substrate 12, a second metal layer 13, a second transparent substrate 14 and a third metal layer 15 that are stacked in sequence. The first transparent substrate 12 is disposed above the first metal layer 11, the second metal layer 13 is disposed above the first transparent substrate 12, the second transparent substrate 14 is disposed above the second metal layer 13, and the third metal layer 15 is disposed above the second transparent substrate 14. It should be noted that the above-mentioned "one element disposed above another element" refers to a relative orientation of the two elements, rather than restricting that one of the elements is disposed above and contacts the other element.

As shown in FIG. 1 and FIG. 3, the metamaterial array plate 2 has an incident surface 21 and an exit surface 22 opposite to each other, and for an incident electromagnetic wave 31 with a predetermined operating frequency band incident from the incident surface 21 (e.g., incident from an outdoor base station 3 to indoors), the transparent electromagnetic wave focusing device 100 provided by the present disclosure has a form of a transparent film, which can be attached to a surface of a window glass 4, such that the incident electromagnetic wave 31 can be focused on a reference point 5 after passing through the exit surface 22. To achieve electromagnetic wave focusing, the comb-tooth pattern combinations corresponding to the metamaterial unit cells 1 can vary with a plurality of compensation phase differences, such that the incident electromagnetic wave 31, having different phase differences while passing through different regions of the incident surface 21, can be focused on the reference point 5.

It should be noted that the metamaterial is a material engineered to have a property that is not found in naturally occurring materials. Since a size of the unit cell is much smaller than particular wavelengths, the metamaterial exhibits properties such as a negative permittivity, a negative permeability, and a negative refractive index. Negative index materials, also known as left-handed materials, allow wave vectors and Poynting vectors to propagate on different sides of a normal plane. Therefore, when light is incident on a metamaterial, it exhibits an opposite direction of wave propagation to that of ordinary materials. More specifically, in the present disclosure, the metamaterial array plate 2 is utilized to make the electromagnetic wave refracted or bent in a different way from the normal positive refractive index material, and finally the electromagnetic wave can be focused on the reference point 5.

Figure 4:
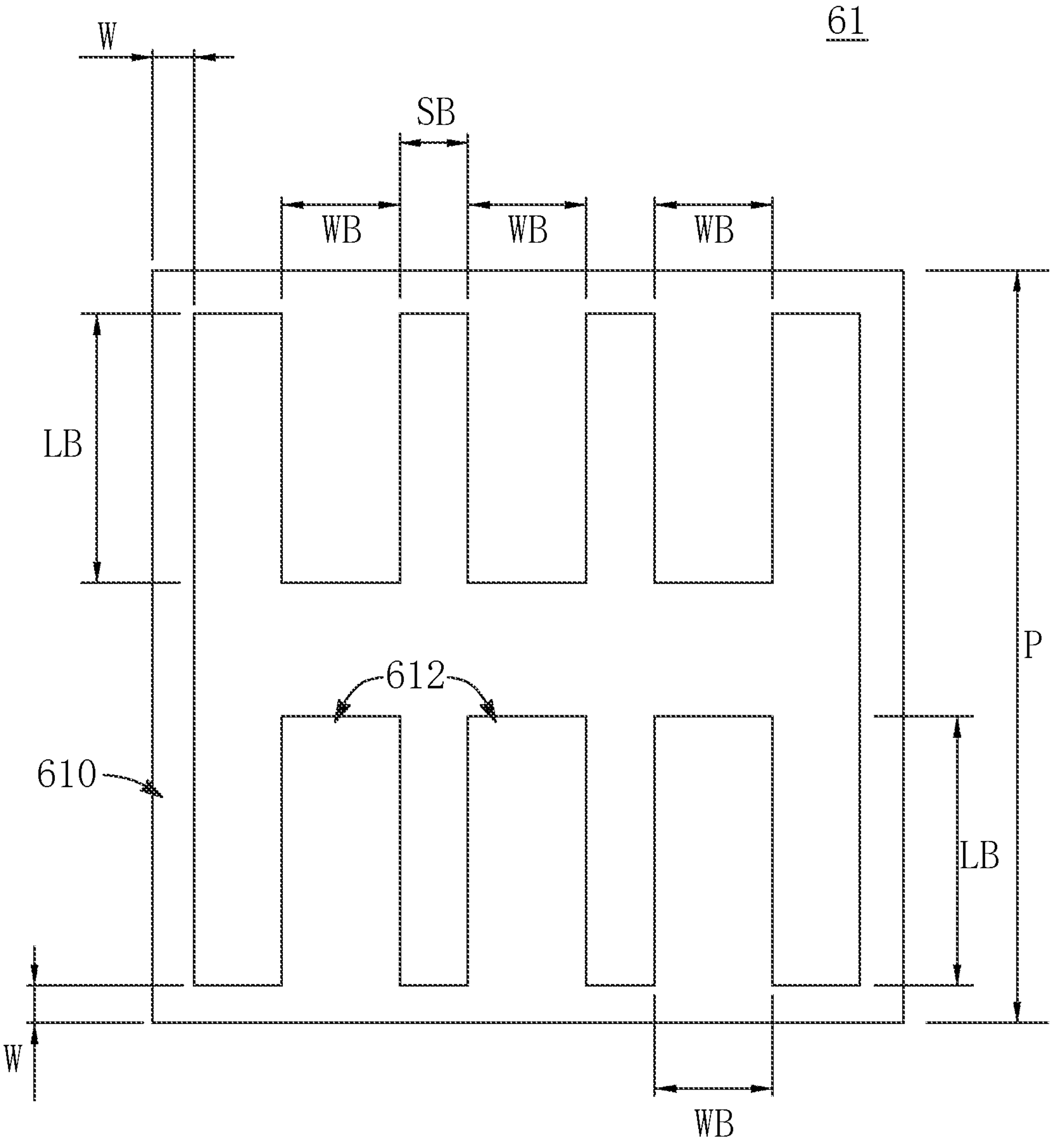
FIGS. 4 to 6 are respectively first to third schematic top views of comb-tooth patterns according to embodiments of the present disclosure.
Figure 5:
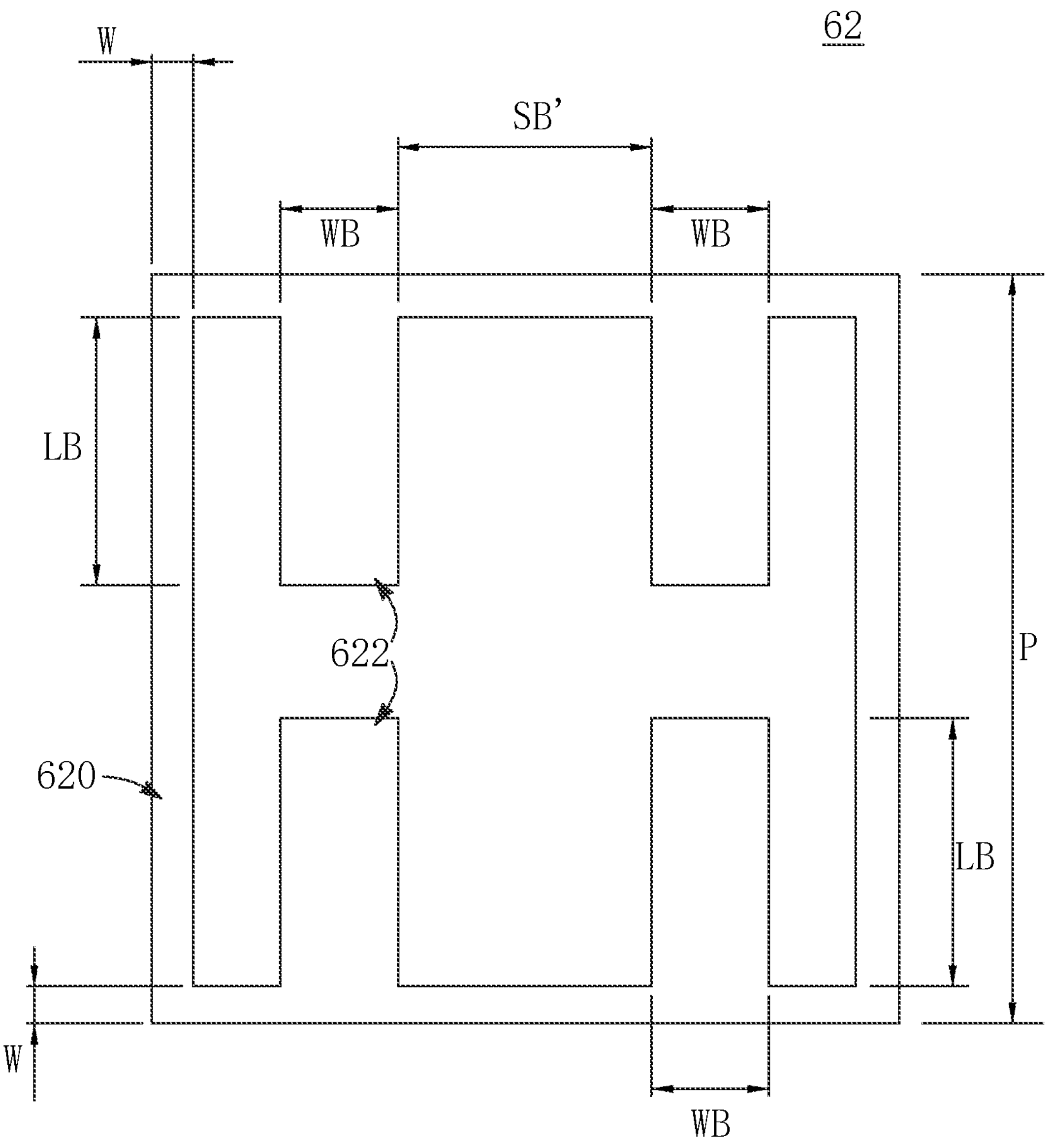
Figure 6:
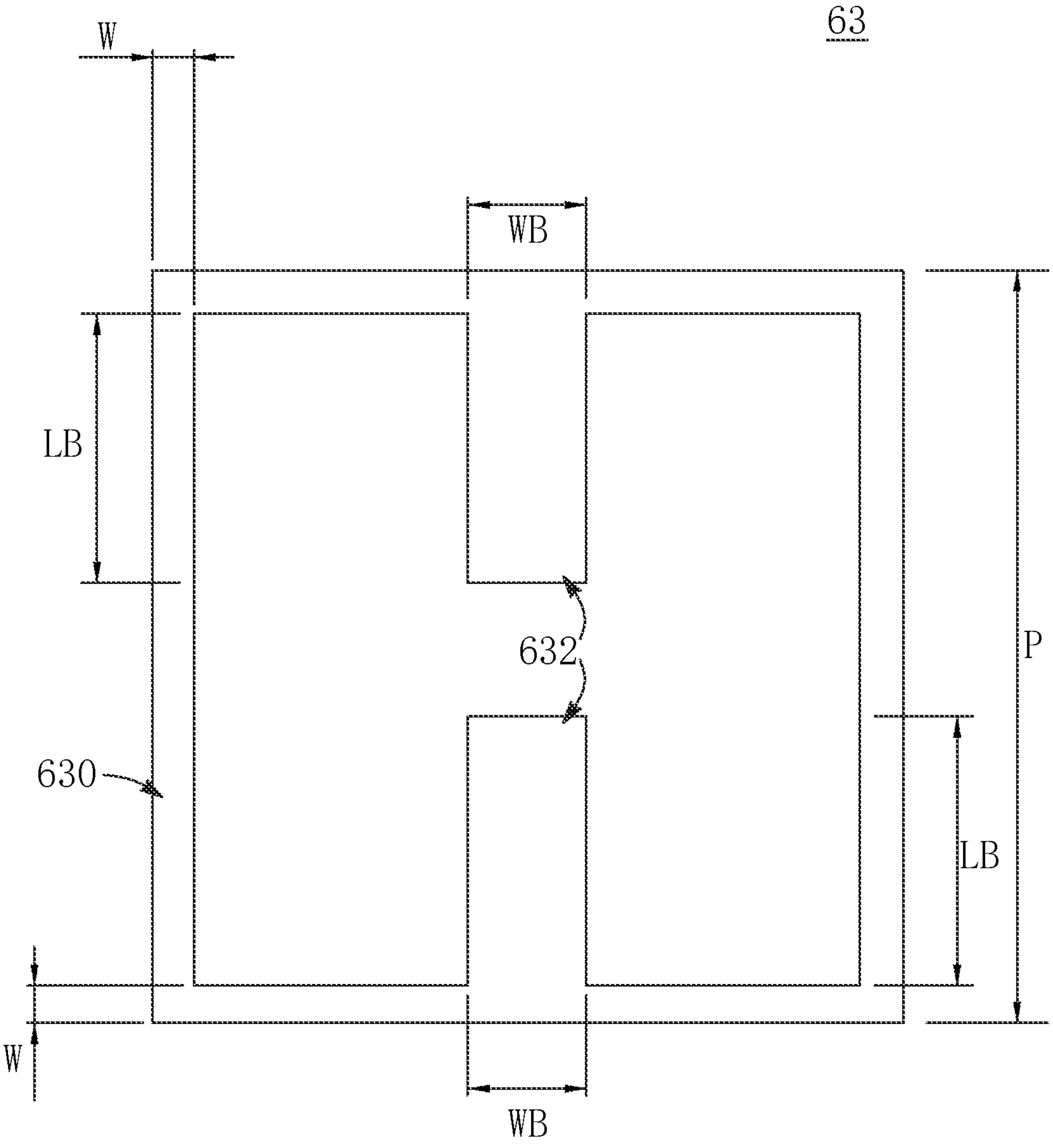

Reference is made to FIGS. 4 to 6, which are respectively first to third schematic top views of comb-tooth patterns according to embodiments of the present disclosure. The first metal layer 11 has a first comb-tooth pattern, the second metal layer 13 has a second comb-tooth pattern, the third metal layer 15 has a third comb-tooth pattern, and the first comb-tooth pattern, the second comb-tooth pattern and the third comb-tooth pattern can respectively be, for example, a comb-tooth pattern 61, 62 or 63 shown in FIGS. 4 to 6. Furthermore, teeth of the first comb-tooth pattern, the second comb-tooth pattern and the third comb-tooth pattern can correspond to a first quantity of teeth, a second quantity of teeth and a third quantity of teeth, respectively.

Taking FIG. 4 as an example, the comb-tooth pattern 61 includes an outer frame 610, and three pairs of teeth 612 arranged along sides and facing each other, and for convenience of description, a quantity of teeth of the comb-tooth pattern 61 is described as 3 (pairs). The outer frame 610 can be, for example, a square outer frame having a frame length P, and an outer side and an inner side (i.e., an outer edge and an inner edge) of the outer frame 610 are separated by a width W. On the other hand, the teeth 612 protrude from two opposite inner sides of the outer frame 610 toward a center portion of the outer frame 610. In this embodiment, there are three pairs of teeth 612 arranged along sides and facing each other, and the teeth 612 are symmetrical. For example, each tooth 612 can have the same tooth length LB, tooth width WB and tooth spacing SB. It should be noted that the above is only an example, and the present disclosure is not limited thereto. On the premise that the predetermined phase differences can be achieved, an arrangement of the teeth 612 may not be symmetrical.

Taking FIG. 5 as an example, the comb-tooth pattern 62 includes an outer frame 620, and two pairs of teeth 622 arranged along sides and facing each other, and for the convenience of description, a quantity of teeth of the comb-tooth pattern 61 is described as 2 (pairs). It should be noted that the comb-tooth pattern 62 can be regarded as formed by removing a pair of teeth 612 in the middle of the outer frame 610 from the comb-tooth pattern 61. Therefore, a tooth interval SB' can be regarded as twice the tooth interval SB plus the tooth width WB. In addition, the structure of the comb-tooth pattern 62 is substantially similar to that of the comb-tooth pattern 61, and thus repeated description is omitted.

Taking FIG. 6 as an example, the comb-tooth pattern 63 includes an outer frame 630, and a pair of teeth 632 arranged along sides and facing each other, and for the convenience of description, a quantity of teeth of the comb-tooth pattern 61 is described as 1 (pair). It should be noted that the comb tooth pattern 63 can be regarded as being formed by removing the two pairs of teeth 612 on both sides of the outer frame 610 from the comb tooth pattern 61, and since there is only one pair of teeth 632, the tooth interval is not particularly defined. In addition, the structure of the comb-tooth pattern 63 is substantially similar to that of the comb-tooth patterns 61 and 62, and thus repeated description is omitted.

In addition, in one embodiment of the present disclosure, the quantity of teeth of the comb-tooth pattern can be changed from 0 to 3 (pairs), when the quantity of teeth is mentioned to be 1, 2, and 3 hereinafter, it means that the comb-tooth pattern has one pair, two pairs and three pairs of teeth. When the quantity of teeth mentioned below is 0, it means that the comb-tooth pattern has only the outer frame without any tooth structure.

Referring to FIGS. 1 and 3, a center of the metamaterial array plate 2 is taken as a reference center point, when the signal source (such as the base station 3) generates a wave, a path length increases with a distance from the reference center point, which also means that a phase delay varies with the distance from the reference center point. Therefore, in the embodiment of the present disclosure, a distribution of the compensation phase difference in the metamaterial array plate 2 can be designed in a concentric phase difference circle, and the phase differences can be calculated by two factors, one is a distance from an observation point to the reference center point, the other is an operating frequency of the signal, for example, for 5G millimeter wave, the operating frequency can be above 24 GHz, for example, 28 GHz.

Figure 7:
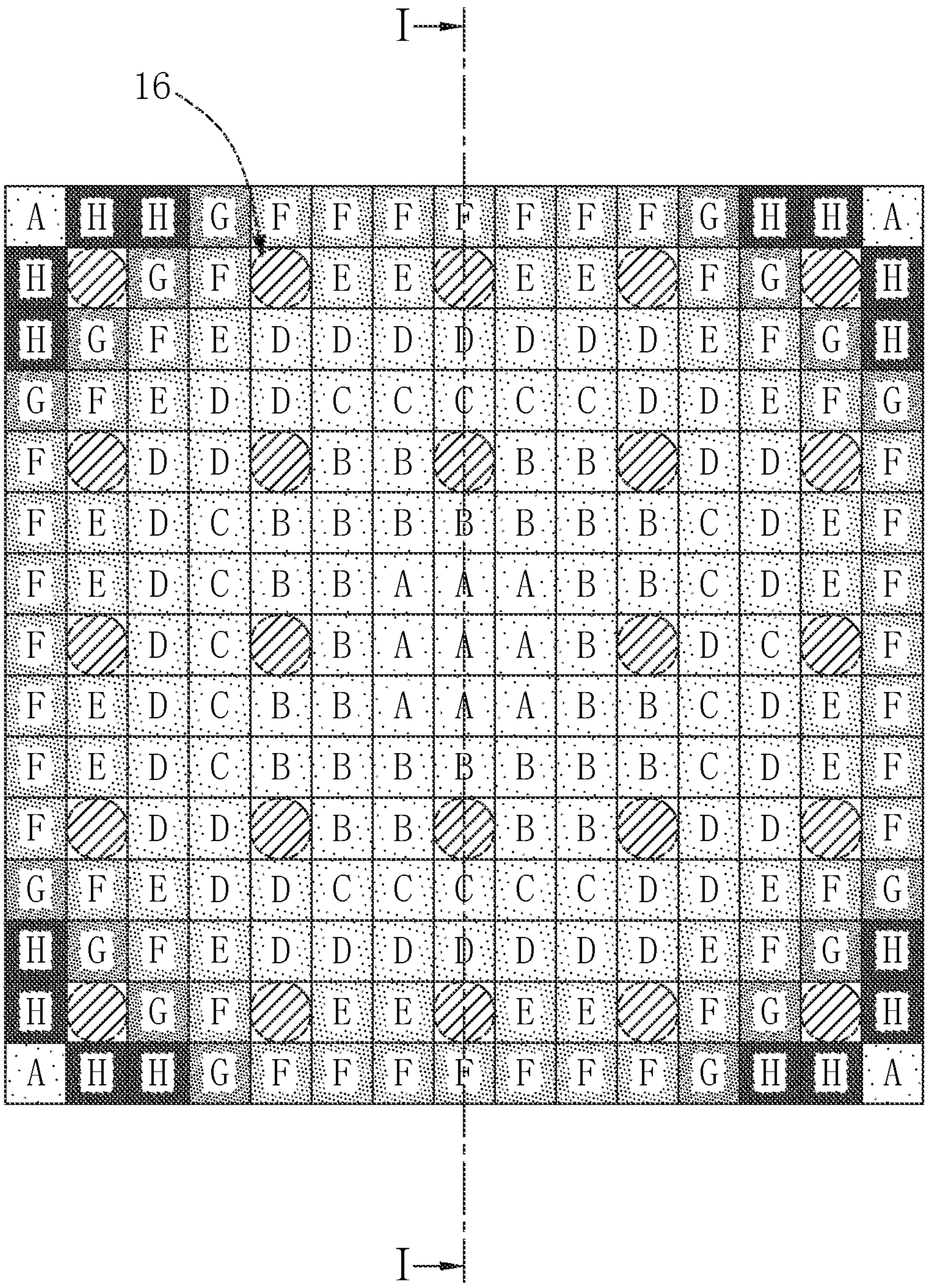
FIG. 7 is a schematic top view of a metamaterial array plate according to one embodiment of the present disclosure.

Reference is made to FIG. 7, which is a schematic top view of a metamaterial array plate according to one embodiment of the present disclosure. As shown in FIG. 1 and FIG. 7, to compensate the above-mentioned structural phase differences, the compensation phase differences corresponding to the metamaterial unit cells 1 can be gradually increased from the edge region ER toward the central region CR of the incident surface 21, and the compensation phase differences can be changed periodically within a phase difference range of 0 to 360 degrees, such that a plurality of portions of the incident electromagnetic wave that pass through different regions of the incident surface 21 have phase differences close to 0 degrees at the reference point that the incident electromagnetic wave being focused.

In the embodiment of FIG. 7, the 360-degree phase range can be divided by intervals of 45 degrees. Therefore, the metamaterial unit cells 1 with eight different compensation phase differences are required. For the comb-tooth patterns provided in FIGS. 4 to 6, as the quantity of teeth or the tooth length LB increases, a phase delay that the comb-tooth pattern can provide is higher. In this embodiment, the metamaterial unit cell 1 is composed of three-layer metal comb-tooth patterns with different quantities of tooth and tooth lengths. An electromagnetic wave simulation software, such as high frequency structure simulator (HFSS), can be used to simulate the arrangements of different comb-tooth patterns, and to determine whether or not the phase delays required for focusing are met. Optimal parameters of the metamaterial unit cell 1 are obtained through the simulation, as shown in Table I below:

TABLE I

| Group | Transmission Coefficient ($S_{21}$) (dB) | Phase (degrees) | Tooth length LB (mm) |
|---|---|---|---|
| A | −0.1 | −255 | 0.955 |
| B | −0.076 | −211 | 0.93 |
| C | −0.26 | −165 | 0.892 |
| D | −2.45 | −120 | 0.822 |
| E | −2.11 | −75.5 | 0.65 |
| F | −0.06 | −30.0 | 0.49 |

TABLE I-continued

| Group | Transmission Coefficient ($S_{21}$) (dB) | Phase (degrees) | Tooth length LB (mm) |
|---|---|---|---|
| G | −2.12 | +15.15 | 0.25 |
| H | −0.65 | −298 | 0.97 |

Reference can be further made to Table II. Parameters in Table II are preferable parameters used in actual manufacturing, and transmission coefficients and phases are basically close to Table 1, only phase shifted by the thickness of the structure is considered during manufacturing, therefore, the tooth lengths LB are finely tuned.

TABLE II

| | Group | | | | | | | |
|---|---|---|---|---|---|---|---|---|
| Parameters | A | B | C | D | E | F | G | H |
| P (mm) | | | | 2.475 | | | | |
| W (mm) | | | | 0.103 | | | | |
| LB (mm) | 0.982 | 0.95 | 1 | 0.87 | 0.86 | 0.53 | 0.3 | 1.022 |
| WB (mm) | | | | 0.41 | | | | 0.60 |

The layout of groups A to H is shown in FIG. 7. The metamaterial unit cells 1 at the four corners utilized the group A, and the metamaterial unit cells 1 are arranged according to a sequence of the groups H-G-F-E-D-C-B-A from the periphery to the center of the metamaterial array plate 2. It should be noted that, during a structural optimization for the metamaterial unit cells 1, a structure with a relatively high transmission coefficient $S_{21}$ is selected to allow more waves to pass through the metamaterial array plate 2. Therefore, as shown in Table I, in one embodiment of the present disclosure, the transmission coefficients of at least five groups of the metamaterial unit cells 1 are greater than −0.65 dB, and there are at most three groups of metamaterial unit cells 1 have the transmission coefficients that are less than −2.1 dB but greater than −2.45 dB.

On the other hand, although a range of the phases varies from −298 degrees to +15.5 degrees, however, since the phase is cycled by 360 degrees, it can still be considered that the phase range of 360 degrees is divided by intervals of about 45 degrees. Furthermore, although the frame length P and the width W in this embodiment are fixed values after the structural optimization, the present disclosure is not limited thereto.

Reference is made to FIGS. 8 to 12, which are respectively schematic diagrams of first to fifth comb-tooth pattern combinations according to embodiments of the present disclosure.

Figure 8:
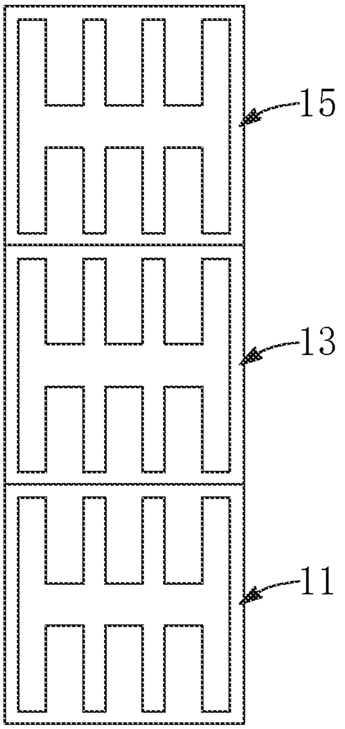
FIGS. 8 to 12 are respectively schematic diagrams of first to fifth comb-tooth pattern combinations according to embodiments of the present disclosure.

As shown in FIG. 8, in the first comb-tooth pattern combination, the first metal layer 11, the second metal layer 13, and the third metal layer 15 all utilize the structure of the comb-tooth pattern 61, and each have three pairs of the teeth 612. That is, a teeth quantity combination of a first teeth quantity, a second teeth quantity and a third teeth quantity is (3, 3, 3). In addition, the metamaterial unit cells 1 of the group A utilize the first comb-tooth pattern combination, and the tooth length LB is 0.982 mm.

Figure 9:
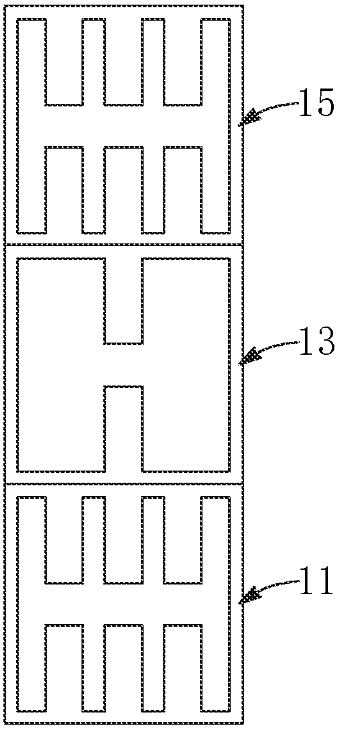

As shown in FIG. 9, in the second comb-tooth pattern combination, the first metal layer 11 and the third metal layer 15 utilize the structure of the comb-tooth pattern 61, and the second metal layer 13 utilizes the structure of the comb-tooth pattern 63. That is, in a teeth quantity combination corresponding to the second comb-tooth pattern combination, the first quantity of teeth, the second quantity of teeth and the third quantity of teeth are (3, 1, 3). Furthermore, the metamaterial unit cells 1 of the groups B, F, and G use the second comb-tooth pattern combination. However, the second comb-teeth pattern combination further includes a first sub-pattern combination, a second sub-pattern combination and a third sub-pattern combination, and tooth lengths of the first sub-pattern combination are larger than tooth lengths of the second sub-pattern combination, and the tooth lengths of the second sub-pattern combination are larger than tooth lengths of the third sub-pattern combination. For example, the groups B, F and G correspond to the first sub-pattern combination, the second sub-pattern combination and the third sub-pattern combination, respectively, and the tooth lengths LB corresponding to the groups B, F and G vary from large to small, and are 0.95 mm, 0.53 mm and 0.3 mm.

Figure 10:
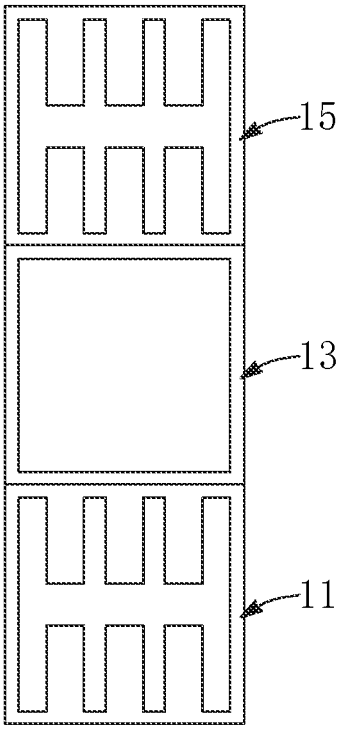

As shown in FIG. 10, in the third comb-tooth pattern combination, the first metal layer 11 and the third metal layer 15 both utilize the structure of the comb-tooth pattern 61, while the second metal layer 13 utilizes a frame-only structure. That is, in the tooth quantity combination corresponding to the third comb-tooth pattern combination, the first quantity of teeth, the second quantity of teeth and the third quantity of teeth are (3, 0, 3). In addition, the metamaterial unit cells 1 of the group D utilize the third comb-tooth pattern combination, and the tooth length LB is 0.87 mm.

Figure 11:
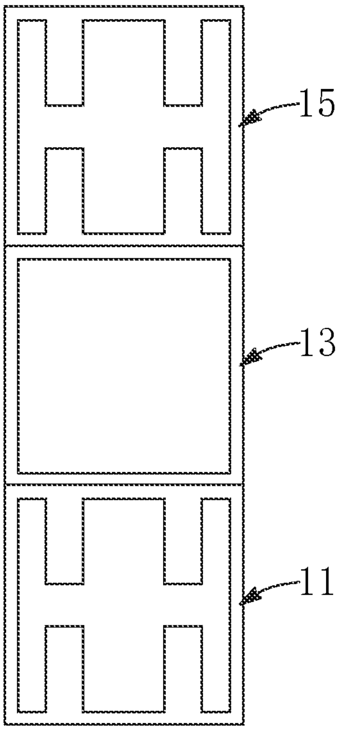

As shown in FIG. 11, in the fourth comb-tooth pattern combination, the first metal layer 11 and the third metal layer 15 both utilize the structure of the comb-tooth pattern 62, while the second metal layer 13 utilizes the frame-only structure. That is, in the tooth quantity combination corresponding to the fourth comb-tooth pattern combination, the first quantity of teeth, the second quantity of teeth and the third quantity of teeth are (2, 0, 2). In addition, the fourth comb-tooth pattern combination further includes a fourth sub-pattern combination and a fifth sub-pattern combination, and tooth lengths of the fourth sub-pattern combination are larger than tooth lengths of the fifth sub-pattern combination. For example, the metamaterial unit cells 1 of the groups C and E utilize the fourth comb-tooth pattern combination and correspond to the fourth sub-pattern combination and the fifth sub-pattern combination, respectively, and the tooth lengths LB corresponding to the groups C and E vary from large to small, and are 1 mm and 0.86 mm.

Figure 12:
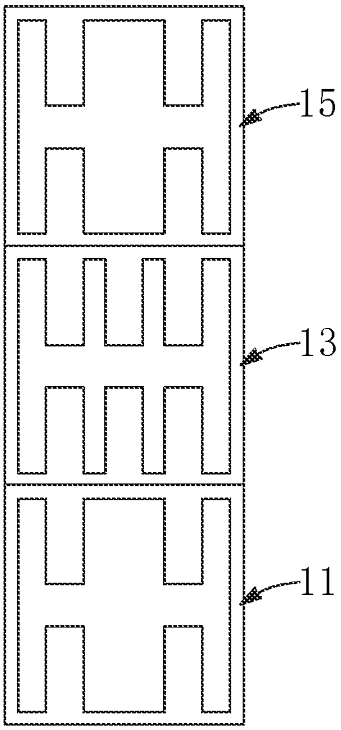

As shown in FIG. 12, in the second comb-tooth pattern combination, the first metal layer 11 and the third metal layer 15 utilize the structure of the comb-tooth pattern 62, and the second metal layer 13 utilizes the structure of the comb-tooth pattern 61. That is, a teeth quantity combination of a first teeth quantity, a second teeth quantity and a third teeth quantity is (2, 3, 2). In addition, the metamaterial unit cells 1 of the group H utilize the fifth comb-tooth pattern combination, and the tooth length LB is 1.022 mm. It should be noted that the tooth width WB of the groups A to G are all 0.41 mm, while the tooth width WB of the group H is 0.60 mm.

Summarizing the above conditions, in one preferred embodiment of the present disclosure, the quantities of teeth of the first comb-tooth pattern of the first metal layer 11 and the third comb-tooth pattern of the third metal layer 15 can be greater than or equal to 2, the quantity of teeth of the second metal layer 15 can be greater than or equal to 2, and the quantity of teeth of the second comb-tooth pattern of the second metal layer 13 can be greater than or equal to zero. It should be noted that, under the above structure, since a variety of comb-tooth pattern combinations appropriately adjust the distribution of the compensation phase differences, 5G millimeter wave passing through the metamaterial array plate 2 can be accurately focused on the reference point 5. Therefore, when the metamaterial array plate 2 is applied to a surface of a window glass that separates an indoor space and an outdoor space, indoor communication quality can be enhanced. Furthermore, since a part of the third comb-tooth pattern and the fourth comb-tooth pattern combinations utilizes the frame-only structure, more electromagnetic waves can penetrate the metamaterial unit cells 1 with the frame-only structure.

Figure 13:
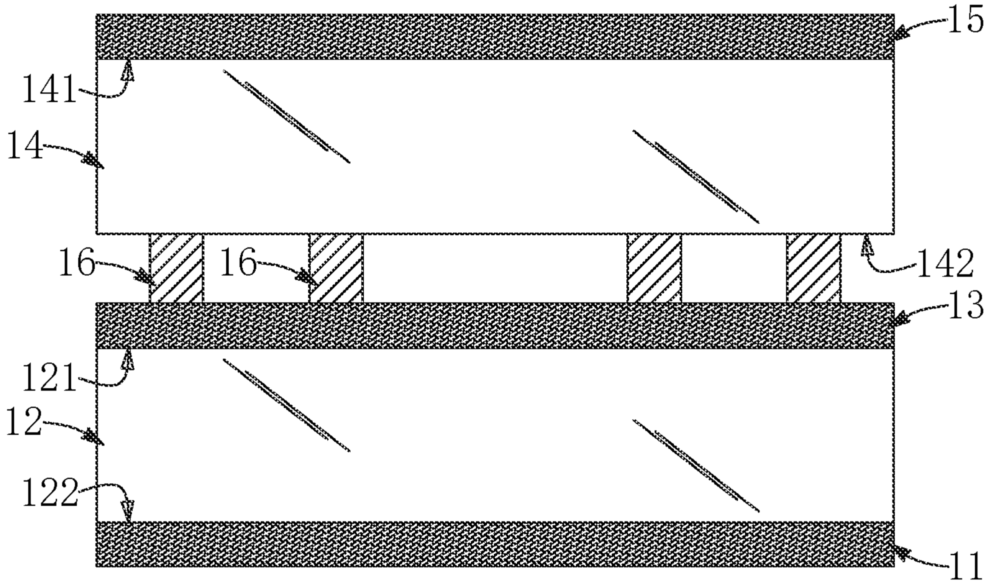
FIG. 13 is a cross-sectional view of the metamaterial array plate 2 taken along line I-I of FIG. 7.

Reference is further made to FIG. 13, which is a cross-sectional view of the metamaterial array plate 2 taken along line I-I of FIG. 7. In the embodiment of FIG. 13, a part of the metamaterial unit cells 1 can include spacers 16 disposed between the second transparent substrate 14 and the second metal layer 13, such that the second metal layers 13 in all the metamaterial unit cells 1 contact the first transparent substrates 12, but does not contact the second transparent substrates 14. In other embodiments, the spacers 16 can also be disposed between the first transparent substrates 12 and the second metal layers 13, such that the second metal layers 13 in all the metamaterial unit cells 1 contact the second transparent substrates 12 without contacting the first transparent substrates 12. The above are only examples, and the present disclosure is not limited thereto.

In more detail, in one embodiment of the present disclosure, the first transparent substrate 12 and the second transparent substrate 14 are two layers of glass substrates, and are configured with three layers of metal (e.g., copper) coatings. Therefore, as shown in FIG. 13, the first metal layer 11 and the second metal layer 13 cover and contact a lower surface 122 and an upper surface 121 of the first transparent substrate 12, respectively, while the third metal layer 15 covers and contacts an upper surface 141 of the transparent substrate 14. The spacers 16 are disposed between a lower surface 142 of the second transparent substrate 14 and the second metal layer 13 for bonding the two glass substrates. In certain embodiments, in order to maintain structural integrity, each layer of all metamaterial unit cells 1 (i.e., each of the first metal layer 11, the first transparent substrate 12, the second metal layer 13, the second transparent substrate 14 and the third metal layers 15) can be integrally formed. It should be noted that the spacer 16 is used to connect an upper half and a lower half of the overall structure. Without the spacers 16, the structure would collapse to damage to the intermediate metal coating (the second metal layer 13), which would make the process difficult. In a preferred embodiment of the present disclosure, coating thicknesses of the first metal layer 11, the second metal layer 13 and the third metal layer 15 are about 600 μm, and thicknesses of the first transparent substrate 12 and the second transparent substrate 14 are about 0.5 mm. The spacer 16 can be, for example, a plastic pad, and its thickness can be in a range of 8 μm to 12 μm, preferably 9.4 μm, so as to avoid structural collapse and maintain the integrity of the intermediate metal coating without being damaged.

Referring to FIG. 7, the metamaterial unit cells 1 with spacers 16 can be distributed and arranged in the metamaterial array plate 2 with an equidistant distribution. In other words, in one preferred embodiment of the present disclosure, the spacers 16 can be uniformly arranged and distributed in the entire metamaterial array plate 2, and a quantity of the metamaterial unit cells 1 with the spacers 16 can account for 8% to 12% of the total, and more preferably 10%. Under such condition, the glass substrate can be provided with sufficient support and maintain sufficient light transmittance.

Figure 14:
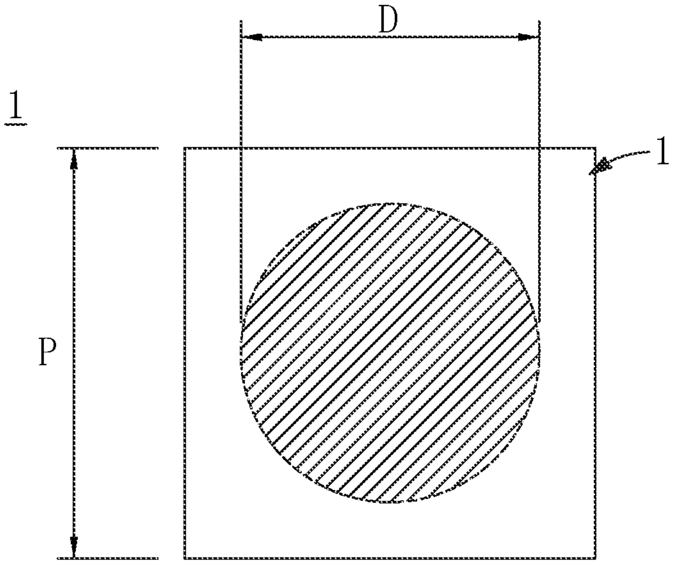
FIG. 14 is a schematic diagram showing sizes of a metamaterial unit cell and a spacer according to one embodiment of the present disclosure.

On the other hand, reference is made to FIG. 14, which is a schematic diagram showing sizes of a metamaterial unit cell and a spacer according to one embodiment of the present disclosure. As shown in FIG. 14, a size of the metamaterial unit cell 1 is basically defined by the aforementioned frame length P, which can be, for example, 2.475 mm, and the spacer 16 can be, for example, a cylinder with a circular cross-section, and a diameter of the circular cross-section can be, for example, 1.8 mm. In other words, a cross-sectional area of the spacer 16 can preferably be greater than 40% of an area of the metamaterial unit cell 1, more preferably 41.5%.

In addition, an overall transparency obtained by measuring the glass substrate is about 91%, but for solid (complete and void-free) first metal layer 11, the second metal layer 13 and the third metal layer 15 covering surfaces of the glass substrates, only few electromagnetic waves can propagate through the metamaterial array plate 2, so there is still room for optimization.

Figure 15:
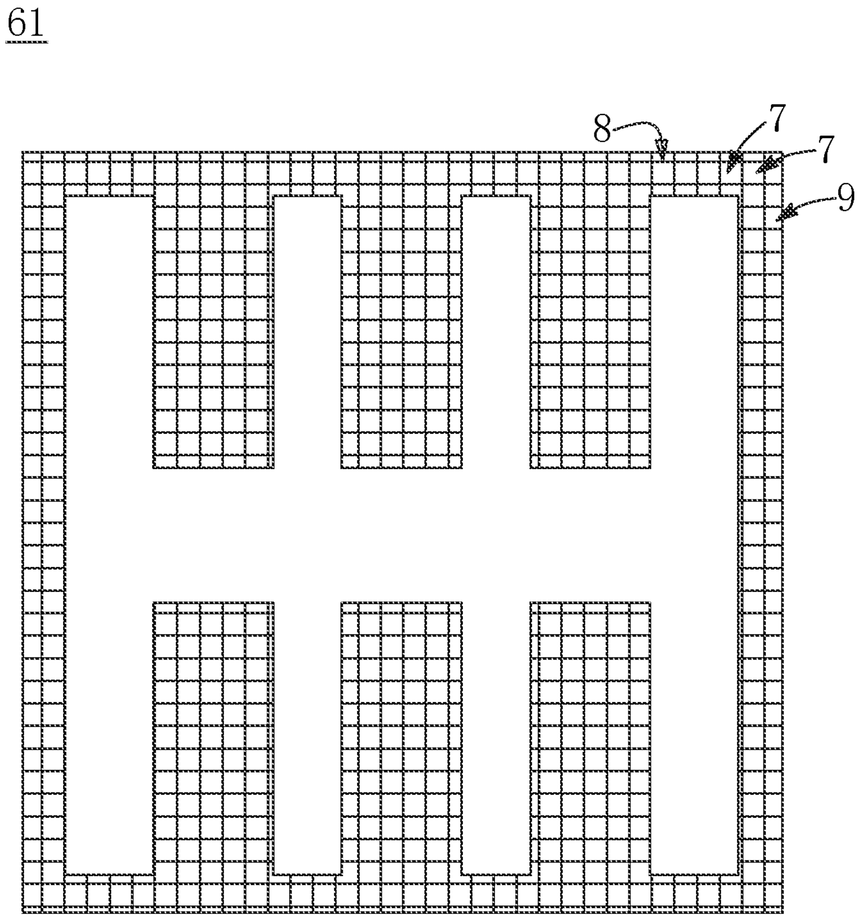
FIG. 15 is a schematic diagram of a comb-tooth pattern formed by metal meshes according to one embodiment of the present disclosure.

Reference is made to FIG. 15, which is a schematic diagram of a comb-tooth pattern formed by metal meshes according to one embodiment of the present disclosure. In some embodiments, the first comb-tooth pattern, the second comb-tooth pattern, and the third comb-tooth pattern can be formed by a plurality of metal meshes, respectively. For example, FIG. 15 takes the comb-tooth pattern 61 of FIG. 6 as an example, which is formed by a plurality of metal meshes 7. In certain embodiments, the metal meshes 7 can be, for example, square meshes, but the present disclosure does not limit the specific implementation of the metal meshes, and the metal meshes 7 can be of any geometric shape.

Taking the square meshes as an example, by removing square patterns on the solid metal layer, a metal layer with the plurality of metal meshes 7 can be produced, and this structure can greatly increase an amount of electromagnetic wave transmission through the metal layer without changing inherent properties of the metal layer, in other words, in the presence of metal meshes, the focusing properties of the metamaterial array plate 2 can still be maintained.

In more detail, the overall transmittance of the metamaterial array plate 2 varies with the dimensions of the square patterns, and micro-wires 8 that form the metal meshes 7 can allow high-frequency radio signals to pass through while reducing an amount of infrared radiation. Therefore, after optimizing the dimensions of the square pattern, mesh-like microfilament structure provides better transmittance. In one preferred embodiment of the present disclosure, a line width of the micro-wires 8 used on the glass substrate is about 0.01 mm, that is, a side length of the square mesh is 0.467 mm. It should be noted that, taking the square mesh as an example, the side length of each of the metal meshes 7 can be smaller than all the tooth lengths, tooth widths and tooth intervals mentioned above; and taking a rectangular mesh as an example, lengths of long and short sides of each of the metal meshes 7 are both smaller than all the tooth lengths, tooth widths and tooth intervals mentioned above.

Moreover, in one embodiment of the present disclosure, the size (i.e., the frame length P) and the tooth width WB of the metal layer of the metamaterial unit cell 1 may not be accurately divided by the side length of the square mesh (0.467 mm), therefore, rectangular grids 9 with unequal length and width are allowed to be utilized at edges of the metal layer, which still does not affect the focusing properties of the metamaterial array plate 2.

In such design, the transmittance of the metal grid structure can reach 85%, which is further multiplied with a transparency of the glass to obtain a total transmittance, that can reach 77.5%. Therefore, the overall transmittance of the metamaterial array plate 2 can be further improved.

Beneficial Effects of the Embodiments

In conclusion, in the transparent electromagnetic wave focusing device provided by the present disclosure, since a variety of comb-tooth pattern combinations appropriately are utilized to adjust the distribution of the compensation phase differences, the electromagnetic wave passing through the metamaterial array plate 2 can be accurately focused on the reference point 5. Therefore, when the metamaterial array plate is applied to a surface of a window glass that separates an indoor space and an outdoor space, indoor communication quality can be enhanced.

Furthermore, in the transparent electromagnetic wave focusing device provided by the present disclosure, spacers are utilized in a part of the metamaterial unit cells to avoid structural collapse and maintain the integrity of the intermediate metal coating, while reducing the difficulty of the process.

On the other hand, by removing square patterns on solid metal layers to produce metal layers with multiple metal grids, an amount of the electromagnetic wave transmission through the metal layer can be greatly increased without changing inherent properties of the metal layer, while maintaining the focusing properties of the metamaterial array plate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transparent electromagnetic wave focusing device, comprising:

a plurality of metamaterial unit cells arranged to form a metamaterial array plate, each metamaterial unit cell including a plurality of metal layers and a plurality of transparent substrates stacked alternately, and wherein each of the metal layers has a comb-tooth pattern, and the plurality of metamaterial unit cells correspond to a plurality of comb-tooth pattern combinations, respectively;

wherein the metamaterial array plate has an incident surface and an exit surface opposite to each other, and for an incident electromagnetic wave with a predetermined operating frequency band incident upon the incident surface, the metamaterial unit cells correspond to a plurality of compensation phase differences, such that the incident electromagnetic wave that passes through the exit surface is focused on a reference point; and wherein the comb-tooth pattern combinations vary with the corresponding compensation phase differences.

2. The transparent electromagnetic wave focusing device according to claim 1, wherein the compensation phase differences are periodically changed in a phase difference range of 0 to 360 degrees from an edge region of the incident surface to a central region of the incident surface, such that phase differences of a plurality of portions of the incident electromagnetic wave that pass through different regions of the incident surface are reduced or eliminated at the reference point.

3. The transparent electromagnetic wave focusing device according to claim 2, wherein each of the plurality of metamaterial unit cells includes:

a first metal layer;

a first transparent substrate disposed above the first metal layer;

a second metal layer disposed above the first transparent substrate;

a second transparent substrate disposed above the second metal layer; and a third metal layer disposed above the second transparent substrate, wherein each of the metamaterial unit cells has one of the comb-tooth pattern combinations, and in the corresponding comb-tooth pattern combination, the first metal layer has a first comb-tooth pattern, the second metal layer has a second comb-tooth pattern, the third metal layer has a third comb-tooth pattern, and the first comb-tooth pattern and the third comb-tooth pattern have a first quantity of teeth and a third quantity of teeth that are greater than or equal to 2, and the second comb-tooth pattern has a second quantity of teeth that is greater than or equal to zero.

4. The transparent electromagnetic wave focusing device according to claim 3, wherein a portion of the metamaterial unit cells further includes a spacer disposed between the second transparent substrate and the second metal layer, or disposed between the first transparent substrate and the second metal layer.

5. The transparent electromagnetic wave focusing device according to claim 4, wherein in each of the plurality of metamaterial unit cells, when the spacer is disposed between the second transparent substrate and the second metal layer, the second metal layer contacts the first transparent substrate without contacting the second transparent substrate, and when the spacer is disposed between the first transparent substrate and the second metal layer, the second metal layer contacts the second transparent substrate without contacting the first transparent substrate.

6. The transparent electromagnetic wave focusing device according to claim 4, wherein the metamaterial unit cells with the spacers are arranged in the metamaterial array plate in an equidistant distribution.

7. The transparent electromagnetic wave focusing device according to claim 3, wherein each of the first comb-tooth patterns, the second comb-tooth patterns and the third comb-tooth patterns is formed by a plurality of metal meshes, and the plurality of metal meshes each have dimensions that are smaller than tooth lengths, tooth widths and tooth intervals of teeth in the first comb-tooth pattern, the second comb-tooth pattern and the third comb-tooth pattern.

8. The transparent electromagnetic wave focusing device according to claim 7, wherein the first comb-tooth pattern, the second comb-tooth pattern and the third comb-tooth pattern each include:

an outer frame; and a plurality of teeth protruding from opposite inner sides of the outer frame toward a center portion of the outer frame, and the teeth are symmetrical, wherein the teeth of the first comb-tooth pattern, the second comb-tooth pattern and the third comb-tooth pattern correspond to the first quantity of teeth, the second quantity of teeth and the third quantity of teeth, respectively, and when the second quantity of teeth is zero, the second comb-tooth pattern only has the outer frame.

9. The transparent electromagnetic wave focusing device according to claim 7, wherein a quantity of the compensation phase differences is 8, and the compensation phase differences each differ by 45 degrees.

10. The transparent electromagnetic wave focusing device according to claim 8, wherein the comb-tooth pattern combinations include a first to a fifth comb-tooth pattern combinations, the first to the fifth comb-tooth pattern combinations correspond to a plurality of teeth quantity combinations, and the plurality of teeth quantity combinations have a first teeth quantity, a second teeth quantity and a third teeth quantity of (3, 3, 3), (3, 1, 3), (3, 0, 3), (2, 0, 2) and (2, 3, 2), respectively for each of the teeth quantity combinations.

11. The transparent electromagnetic wave focusing device according to claim 9, wherein the second comb-tooth pattern combination further includes a first sub-pattern combination, a second sub-pattern combination and a third sub-pattern combination, and the tooth lengths of the first sub-pattern combination are larger than those of the second sub-pattern combination, and the tooth lengths of the second sub-pattern combination are larger than those of the third sub-pattern combination, the fourth comb-tooth pattern combination further includes a fourth sub-pattern combination and a fifth sub-pattern combination, and the tooth lengths of the fourth sub-pattern combination are larger than those of the fifth sub-pattern combination.

12. The transparent electromagnetic wave focusing device according to claim 10, wherein the tooth width of the fifth comb-tooth pattern combination is different from the tooth width of the first to the fourth comb-tooth pattern combinations.

13. The transparent electromagnetic wave focusing device according to claim 10, wherein the plurality of metamaterial unit cells has an arrangement formed by periodically arranging, from the edge region toward the central region, the first comb-tooth pattern combination, the fifth comb-tooth pattern combination, the third sub-pattern combination, the second sub-pattern combination, the fifth sub-pattern combination, the third comb-tooth pattern combination, the fourth sub-pattern combination, and the first sub-pattern combination.

* * * * *